United States Patent
Lee et al.

(10) Patent No.: US 8,347,404 B2
(45) Date of Patent: Jan. 1, 2013

(54) METHOD, SYSTEM, AND DATA SERVER FOR CHECKING REVOCATION OF CONTENT DEVICE AND TRANSMITTING DATA

(75) Inventors: Choong-hoon Lee, Seoul (KR); Yong-kuk You, Seoul (KR); Jun Yao, Suwon-si (KP)

(73) Assignee: Samsung Electronics Co., Ltd., Suwon-si (KR)

( * ) Notice: Subject to any disclaimer, the term of this patent is extended or adjusted under 35 U.S.C. 154(b) by 1052 days.

(21) Appl. No.: 11/940,498

(22) Filed: Nov. 15, 2007

(65) Prior Publication Data

US 2010/0023760 A1    Jan. 28, 2010

(30) Foreign Application Priority Data

Jun. 22, 2007  (KR) .................. 10-2007-0061845

(51) Int. Cl.
*G06F 7/04* (2006.01)
*G06F 17/30* (2006.01)
*G06F 21/00* (2006.01)
*H04N 7/16* (2011.01)
*H04L 29/06* (2006.01)

(52) U.S. Cl. ............... 726/29; 713/158; 705/57; 705/59
(58) Field of Classification Search ............ 726/29; 713/158
See application file for complete search history.

(56) References Cited

U.S. PATENT DOCUMENTS

| | | | |
|---|---|---|---|
| 5,745,574 A * | 4/1998 | Muftic | 713/157 |
| 6,820,063 B1 * | 11/2004 | England et al. | 705/54 |
| 6,961,858 B2 * | 11/2005 | Fransdonk | 726/29 |
| 7,088,822 B2 * | 8/2006 | Asano | 380/45 |
| 7,110,982 B2 * | 9/2006 | Feldman et al. | 705/51 |
| 7,257,707 B2 * | 8/2007 | England et al. | 713/164 |
| 7,290,138 B2 * | 10/2007 | Freeman et al. | 713/167 |
| 7,337,315 B2 * | 2/2008 | Micali | 713/157 |
| 7,373,506 B2 * | 5/2008 | Asano et al. | 713/168 |
| 7,376,975 B2 * | 5/2008 | Lafornara et al. | 726/27 |
| 7,421,411 B2 * | 9/2008 | Kontio et al. | 705/52 |
| 7,421,742 B2 * | 9/2008 | Kitani et al. | 726/31 |
| 7,434,259 B2 * | 10/2008 | Hofmeister et al. | 726/22 |
| 7,437,771 B2 * | 10/2008 | Alkove et al. | 726/29 |
| 7,543,140 B2 * | 6/2009 | Dillaway et al. | 713/156 |
| 7,549,172 B2 * | 6/2009 | Tokutani et al. | 726/27 |
| 7,634,816 B2 * | 12/2009 | Alkove et al. | 726/27 |
| 7,644,443 B2 * | 1/2010 | Matsuyama et al. | 726/27 |

(Continued)

FOREIGN PATENT DOCUMENTS

GB    2439574 A  *  1/2008

*Primary Examiner* — Carolyn B Kosowski

(74) *Attorney, Agent, or Firm* — Sughrue Mion, PLLC

(57) ABSTRACT

A method of checking revocation of a device and software, and transmitting data to a secure device and secure software whose keys have not been leaked is provided. The method includes receiving authentication information of a device requesting transmission of data, and authentication information of software accessing the data in the device; checking revocation of the device and the software, based on the received authentication information; and transmitting the data to the software of the device, when the device and the software are not revoked as a result of the checking. By doing so, during transmission of data, such as content or a license, it is possible to check security of a device and software being executed in the device, so that the data can be more safely transmitted.

18 Claims, 8 Drawing Sheets

U.S. PATENT DOCUMENTS

| | | | |
|---|---|---|---|
| 7,650,492 B2 * | 1/2010 | Sherwani et al. | 713/151 |
| 7,657,739 B2 * | 2/2010 | Nakano et al. | 713/158 |
| 7,707,644 B2 * | 4/2010 | Choi et al. | 726/27 |
| 7,788,181 B2 * | 8/2010 | Ben-Menahem et al. | 705/59 |
| 7,802,312 B2 * | 9/2010 | You et al. | 726/31 |
| 7,907,729 B2 * | 3/2011 | Morrow et al. | 380/251 |
| 7,987,510 B2 * | 7/2011 | Kocher et al. | 726/27 |
| 8,107,626 B2 * | 1/2012 | Guzman et al. | 380/239 |
| 8,165,294 B2 * | 4/2012 | Morrow et al. | 380/251 |
| 2002/0157002 A1 * | 10/2002 | Messerges et al. | 713/155 |
| 2003/0037237 A1 * | 2/2003 | Abgrall et al. | 713/166 |
| 2004/0039924 A1 * | 2/2004 | Baldwin et al. | 713/189 |
| 2005/0086504 A1 * | 4/2005 | You et al. | 713/193 |
| 2005/0216419 A1 * | 9/2005 | Lee et al. | 705/59 |
| 2007/0094493 A1 * | 4/2007 | Ali et al. | 713/156 |
| 2007/0124602 A1 * | 5/2007 | Wald et al. | 713/193 |
| 2007/0192837 A1 * | 8/2007 | Lee et al. | 726/4 |
| 2007/0199075 A1 * | 8/2007 | Skoric et al. | 726/27 |
| 2008/0072040 A1 * | 3/2008 | Asano et al. | 713/158 |
| 2008/0235810 A1 * | 9/2008 | Staring et al. | 726/29 |

* cited by examiner

FIG. 4
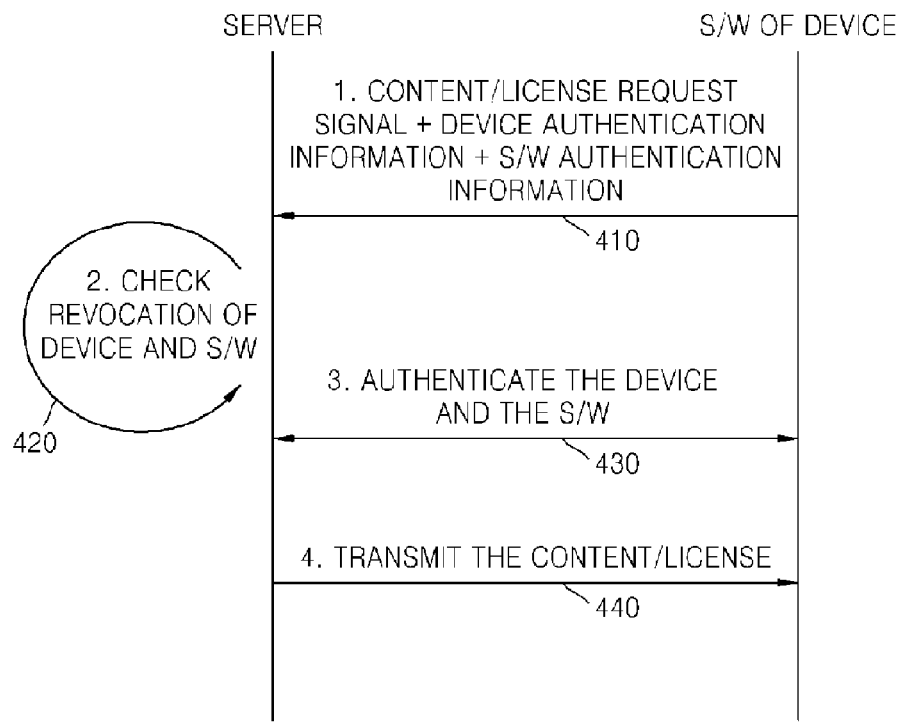
FIG. 5A
FIG. 5B
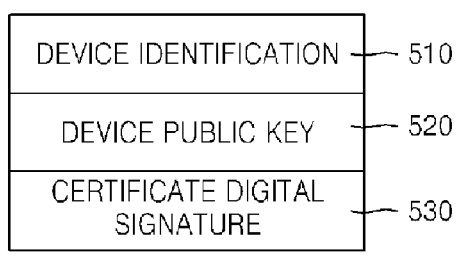
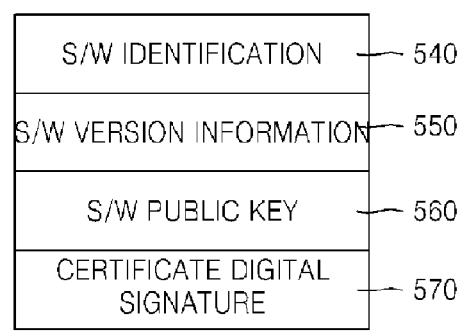

METHOD, SYSTEM, AND DATA SERVER FOR CHECKING REVOCATION OF CONTENT DEVICE AND TRANSMITTING DATA

CROSS-REFERENCE TO RELATED PATENT APPLICATION

This application claims priority from Korean Patent Application No. 10-2007-0061845, filed on Jun. 22, 2007, in the Korean Intellectual Property Office, the disclosure of which is incorporated herein in its entirety by reference.

BACKGROUND OF THE INVENTION

1. Field of the Invention

The present invention relates to a method of checking revocation of a content device and transmitting data, and more particularly, to a method, system, and data server for checking revocation of a device and software and transmitting data, such as contents or a license, to a secure device and secure software whose keys are not leaked.

2. Description of the Related Art

As illegal copying of digital content in the digital content industry has recently increased, a variety of technologies for protecting digital content have been researched and developed. Such examples include a Conditional Access System (CAS) for protecting broadcasting contents, Digital Rights Management (DRM) for determining whether to allow digital content to be used according to rights regarding the digital content, and digital content protection technologies for storage media such as a Content Scrambling System (CSS), Content Protection For Recordable Media (CPRM), and an Advanced Access Content System (AACS).

Most content protection systems such as DRM, CAS, CSS, and the like, control the use of content based on encryption so that only an authorized user or device can use the content only by a permitted method. The content protection system encrypts content, distributes or sells the content, and protects the content by allowing only an authorized to can access a content key capable of decrypting the content.

FIG. 1 is a diagram illustrating a conceptual internal configuration of a conventional content device 100 playing contents by executing downloadable DRM software.

Here, it is possible to install different content protection systems in the content device 100, and in the case where an attempt is made to use content, the content device 100 has a structure in which the content is decrypted or the use of the content is controlled by executing content protection software such as DRM. There are various examples of the content device 100 including a digital television, a set top box, an MPEG Audio Layer-3 (MP3) player, a portable video player, a Digital Video Disc (DVD) player, a Blu-ray player, and the like.

The content device 100 includes a software execution unit 110, a playing/output unit 130 playing/outputting content, and a software storage unit 140 that is a storing medium capable of storing software. DRM software 120 executed in the software execution unit 110 includes a license processing unit 121 processing a content key or a license, and a content decryption unit 122 decrypting content secured by encryption.

The structure for using content protected by the DRM in the content device 100 will now be explained. When data such as content or a license is provided from outside the content device 100, and use of the content, such as playing of the content or transferring the content to an external device, is requested, the content device 100 executes the DRM software 120 for controlling the use of the content. The DRM software 120 executed in the software execution unit 110 interprets a license, in the license processing unit 121, for the usage rights of the content, and determines whether the content can be used. If use is permitted, the content is decrypted in the content decryption unit 122. The decrypted content is played or transferred to the external device via the playing/output unit 130. The above example of DRM software is given in order to explain about the present invention, but the content protection software may be other software content protection systems such as CAS software or other content protection software.

A conventional method of encrypting data is to encrypt data by using a secret key or a public key of another party, and to transmit the data. However, in the case of multimedia data having a huge amount of data, separate encryption of content by each user has very low efficiency since high-volume content is encrypted with keys that are always different. Thus, content protection systems mostly use a two-step encryption method in which one content key is used to encrypt the same content, and a user key respectively retained by each user is used to encrypt the one content key.

The user key uses a device key stored in various devices using contents, such as a digital television, a set-top box, an MP3 player, a portable video player, a DVD player, a Blu-ray player, and the like.

Meanwhile, before encrypting data by using the user key and transmitting the data, there is a preceding procedure in which a device key is checked to determine whether the device key has been leaked, so as to ensure security.

Generally, a certification authority (CA) may ensure user integrity of a public key included in a certificate. However, in the case where a private key corresponding to the public key included in the certificate is leaked, stolen, or lost, it may cause serious problems. That is, a malicious user who obtained the private key via wrongful means may disguise oneself as a rightful user. In other words, a malicious user B who obtained a private key of a user A may pretend to be the user A by using a name and a public key of the user A, and may obtain various important items of data. In such a case, a reliable party trusting a certificate may be damaged. Thus, when a key compromise such as a leakage of a private key occurs, damage due to the leakage of the private key has to be prevented by making a certificate related to a corresponding public key invalid so that another user cannot use the certificate. For prevention purposes, a CA may revoke certificates related to a public key corresponding to a damaged private key, and may register the certificates in a Certificate Revocation List (CRL), thereby informing all reliable parties.

Therefore, conventionally, a server providing data keeps the CRL related to a device key used as a user key, and when the server receives a request for data such as content or a license from a certain device in which a key has been leaked, the server checks security of the device by scanning the CRL, and then transmits the data.

However, in a downloadable DRM software environment such as a Personal Computer (PC) in which a content protection system is provided in the form of software or firmware so that the content protection system can be installed in a device via downloading, a user wishing to use desired content allows a content protection system applied to the desired content to be liberally installed in the user's device in the form of software, and then used. By doing so, various contents can be used without considering kinds of content protection systems. Therefore, not only a device but also security of such DRM software has to be ensured.

SUMMARY OF THE INVENTION

In order to satisfy the above-described requirements, the present invention provides a method, system, and data server for checking revocation of a device and software and transmitting data, such as contents or a license, to a secure device and secure software whose keys are not leaked.

According to an aspect of the present invention, there is provided a method of checking revocation of a content device and transmitting data, the method including the operations of receiving authentication information of a device requesting transmission of data, and authentication information of software accessing the data in the device; checking revocation of the device and the software, based on the received authentication information; and transmitting the data to the software of the device, when the device and the software are not revoked as a result of the check.

The method may further include the operation of authenticating at least one of the device and the software, and when the authentication succeeds, the operation of transmitting the data may transmit the data to the software of the authenticated device.

The authentication information of the device and the software may be included in certificates, and the operation of checking the revocation may scan Certificate Revocation Lists (CRLs) of the certificates of the device and the software.

The certificates may include an Identification (ID) of each of the device and the software, a public key, and a digital signature of a Certification Authority (CA).

The certificate of the software may further include version information of the software, and the operation of checking the revocation may further include the operations of scanning a software revocation list including the version information of the software, and checking the revocation of the software having the version indicated by the version information.

The operation of authenticating at least one of the device and the software may be performed by a Challenge-Response (C-R) method, and may include the operations of generating a random number value and transmitting the random number value; receiving return values, wherein the return values are the random number value respectively encrypted with private keys of the device and the software; decrypting the received return values with public keys of the device and the software included in the certificates; and comparing the decrypted return values with the random number value, and authenticating the device and the software.

The operation of authenticating at least one of the device and the software may further include exchanging a session key for using secure session for transmitting the data.

The device may provide a system call function encrypting the random number value with the private key of the device, according to a request of the software.

The authentication information of the device may be included in a certificate. The certificate may include an ID of the device, a public key, and a digital signature of a CA, and the authentication information of the software may include an ID of the software, version information, and a digital signature of the CA related to the authentication information of the software.

The operation of checking the revocation may include the operations of relatively scanning a CRL related to the certificate of the device and a software revocation list comprising version information of the software, and checking the revocation of the device and the revocation of the software having the version indicated by the version information.

The operation of authenticating at least one of the device and the software may be performed by a C-R method, and may include the operations of generating a random number value and transmitting the random number value; receiving a return value, wherein the return value being the random number value encrypted with a private key of the device; decrypting the received return value with a public key of the device comprised in the certificate; and comparing the decrypted return value with the random number value, and authenticating the device.

When the software is installed or executed in the device, the operation of authenticating at least one of the device and the software may further include the operation of authenticating the software by using a digital signature of a CA related to execution codes of the software.

According to another aspect of the present invention, there is provided a transmission system having a first device, and a second device checking revocation of the first device and transmitting data to the first device, the transmission system including a first device transmitting a request signal of data transmission, authentication information of the first device, and authentication information of software accessing the data in the first device; and a second device receiving the transmitted authentication information, and as a result of checking the revocation of the first device and the software, when the first device and the software are not revoked, transmitting the data to the software of the first device.

The second device may authenticate at least one of the first device and the software, and when the authentication succeeds, transmit the data to the software of the first device.

According to another aspect of the present invention, there is provided a data server for checking revocation of a content device and transmitting data, the data server including an authentication information reception unit receiving authentication information of a device requesting transmission of data, and authentication information of software accessing the data in the device; a revocation verification unit checking revocation of the device and the software, based on the received authentication information; and a data transmission unit transmitting the data to the software of the device, when the device and the software are not revoked.

The data server may further include an authentication unit authenticating at least one of the device and the software. When the authentication succeeds, the data transmission unit may transmit the data to the software of the authenticated device.

BRIEF DESCRIPTION OF THE DRAWINGS

The above and other features and advantages of the present invention will become more apparent by describing in detail exemplary embodiments thereof with reference to the attached drawings in which:

FIG. 4 is a diagram illustrating an operation of checking revocation of a device and software and transmitting data, wherein the operation is performed between a server and software of the device, according to an exemplary embodiment of the present invention;

FIG. 5A is a diagram illustrating a structure of a certificate of a device, and FIG. 5B is a diagram illustrating a structure of a certificate of a software, according to another exemplary embodiment of the present invention;

Figure 1:
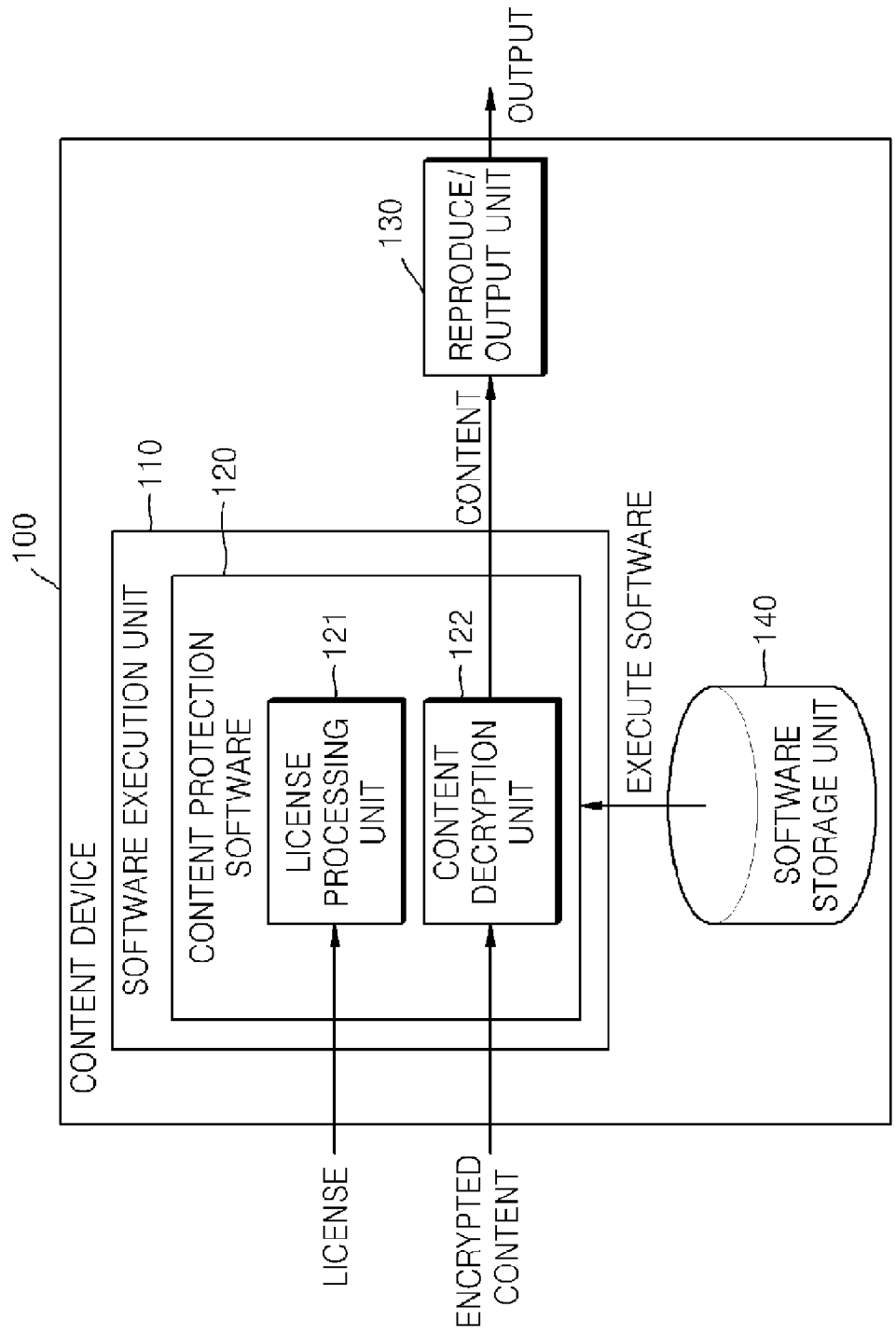
FIG. 1 is a diagram illustrating a conceptual internal configuration of a conventional content device playing contents by executing downloadable Digital Rights Management (DRM) software.

In the drawings, whenever the same element reappears in subsequent drawings, it is denoted by the same reference numeral. Although the drawings illustrate exemplary embodiments of the present invention, the drawings are not drawn according to a reduced scale, and the thicknesses of layers and regions may be exaggerated for clarity.

DETAILED DESCRIPTION OF EXEMPLARY EMBODIMENTS OF THE INVENTION

The attached drawings for illustrating exemplary embodiments of the present invention are referred to in order to gain a sufficient understanding of the present invention, the merits thereof, and the objectives accomplished by the implementation of the present invention.

Hereinafter, the present invention will be described in detail by explaining exemplary embodiments of the invention with reference to the attached drawings.

Figure 2:
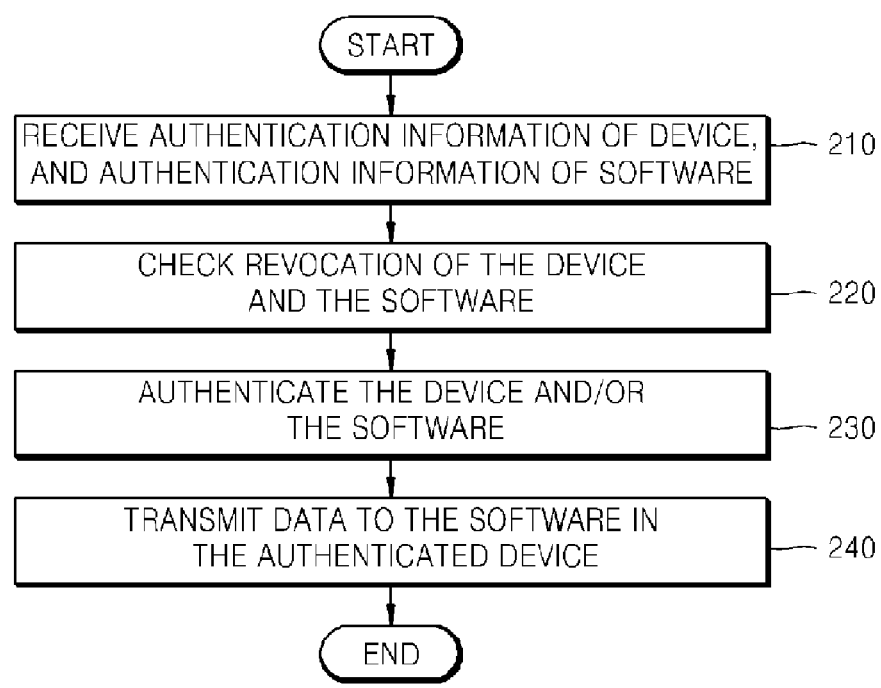
FIG. 2 is a flowchart illustrating a method of checking revocation of a device and software, and transmitting data, according to an exemplary embodiment of the present invention.

FIG. 2 is a flowchart illustrating a method of checking revocation of a device and software, and transmitting data, according to an exemplary embodiment of the present invention.

Referring to FIG. 2, authentication information on a device requesting transmission of data, and authentication information on software accessing the data in the device are received (operation 210). Based on the received authentication information, revocation of the device and the software is checked (operation 220). As a result of the check, when the device and the software are not revoked, data such as content or a license is transmitted to the software of the device (operation 240). Selectively, the device and/or the software are authenticated (operation 230).

Here, the authentication information on the device and the software may include information capable of ensuring the respective subjects requesting data, wherein the information may include an identification (ID), a public key required to encrypt, a digital signature, and other detailed properties of the device and software. Such authentication information may be provided in the form of a certificate.

The revocation may be checked by using a Certificate Revocation List (CRL) informed by a certification authority (CA), or retained in a server itself providing data.

Authenticating the device and/or software means authenticating not only the genuineness of the ID and the public key indicated in the authentication information but also authenticating the subject itself which currently requires data. That is, according to the indication in the authentication information, for example, a public key of a user A may be trusted by using a digital signature of a CA. However, whether a current user transmitting the authentication information is the genuine user A is also authenticated. Related to this, there are two cases in which only the device is authenticated according to the authentication information, and both the device and the software are authenticated according to the authentication information.

Detailed exemplary embodiments of the present invention will now be described below.

Figure 3:
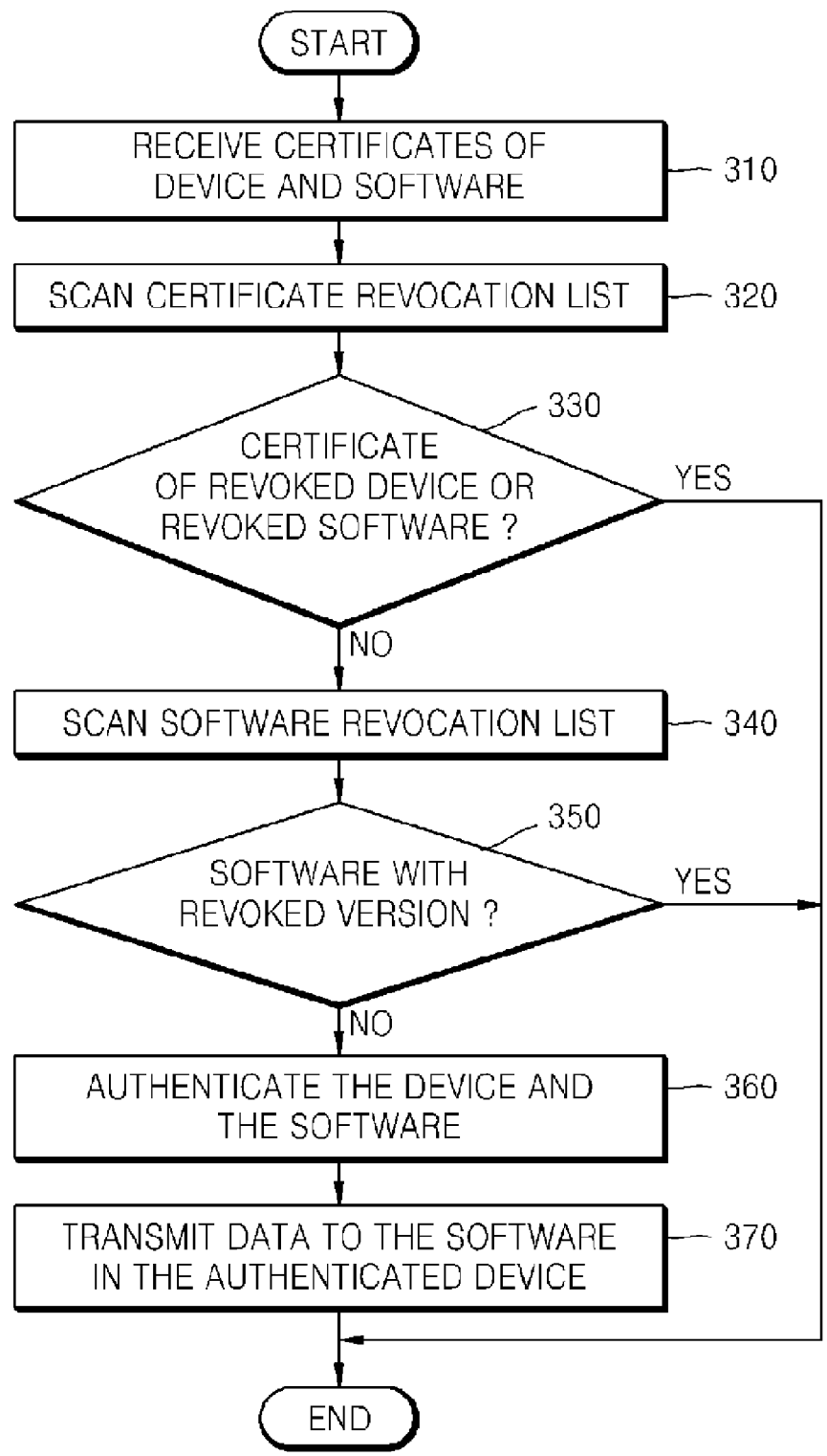
FIG. 3 is a flowchart illustrating a method of checking revocation of a device and software, and transmitting data, according to another exemplary embodiment of the present invention.

FIG. 3 is a flowchart illustrating a method of checking revocation of a device and software, and transmitting data, according to another exemplary embodiment of the present invention.

Referring to FIG. 3, each of the operations is described below.

A server providing data receives certificates respectively related to a device and software of a user requesting data (operation 310). As described above, the certificates include an ID respectively identifying the device and software, a public key, and a digital signature of a CA related to the public key.

In order to verify security of the device and software of the user, the server checks revocation of the received certificates. For this purpose, the server refers to a CRL received from the CA or retained in the server (operation 320), and checks whether the IDs of the device and software are included in the CRL (operation 330). When any one of the IDs of the device and software is included in the CRL, the server refuses transmission of the data.

When the device and the software are not included in the CRL, then it is assumed that the security of the device and the software is verified. Next, the device and the software are authenticated (operation 360), and soon the requested data such as content or a license is transmitted (operation 370). However, before that, additionally, security of a software version may be verified. At this time, information on the software version also has to be included in the certificate related to the software received in operation 310. The server scans a separate software revocation list including information on software versions (operation 340), and checks whether the corresponding software version was vulnerable thereby having been hacked (operation 350). When it is known that the software version has been hacked, that is, when the software version is included in the software revocation list, the server refuses transmission of the requested data.

FIG. 4 is a diagram illustrating an operation of checking revocation of a device and software and transmitting data, wherein the operation is performed between a server and software of the device, according to an exemplary embodiment of the present invention.

Referring to FIG. 4, operations performed and information exchanged between the server and the software of the device of a user are clearly illustrated. The operations are the same as the previous exemplary embodiment described in relation to FIG. 2, and follow a process as described below. Here, the communicating subject for the user is the software of the device such as Digital Rights Management (DRM) software.

1. A server receives authentication information on a device and software, together with a signal requesting a content/license (operation 410).

2. Revocation of the device and software, on which authentication information is received, is checked (operation 420).

3. When the device and software are not revoked, authentication of the device and the software is performed (operation 430).

4. Data of the content and license (or content key) is transmitted to the software of the device (operation 440).

In the operation of performing the authentication of the device and software, in order to use a secure session for transmitting data, a session key may be exchanged.

FIG. 5A is a diagram illustrating a structure of a certificate of a device, and FIG. 5B is a diagram illustrating a structure of a certificate of a software, according to another exemplary embodiment of the present invention.

Referring to FIG. 5A, the certificate related to the device includes a device ID 510, a public key 520, and a digital signature 530 of a certificate related to a CA. Likewise, FIG. 5B includes a software ID 540, a public key 560, and a digital signature 570 of a certificate, and selectively FIG. 5B further includes software version information 550.

When a CRL is checked as described in the previous exemplary embodiment in relation to FIG. 3, IDs of devices and software included in the CRL, and IDs 510 and 540 respectively included in (a) and (b) are compared with each other, and authentication of a device and software is performed by using the public keys 520 and 560.

Also, the software version information 550 included in the certificate related to the software is information for checking whether the version of the software has been hacked, thereby causing it to be revoked.

A server transmitting data is to receive the reliable public keys 520 and 560 which are guaranteed via the digital signature 530 and 570 of the certificates (a) and (b) which are respectively related to the device and the software.

Figure 6:
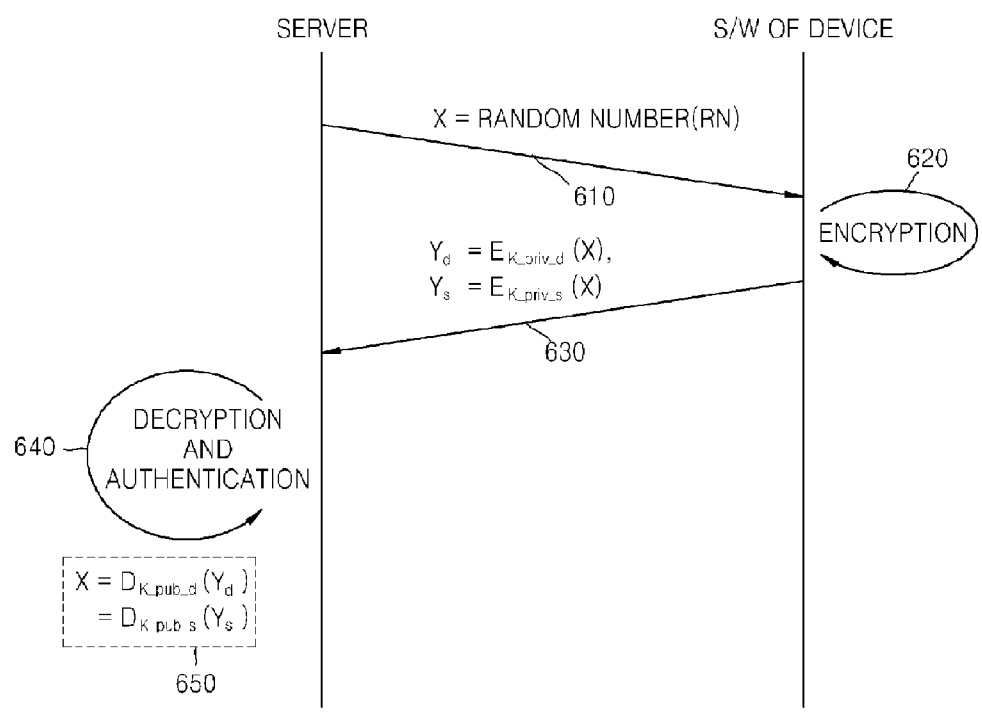
FIG. 6 is a diagram illustrating a process of authenticating a device and software, according to another exemplary embodiment of the present invention.

FIG. 6 is a diagram illustrating a process of authenticating a device and software, according to another exemplary embodiment of the present invention.

Referring to FIG. 6, an authentication process corresponding to operation 360 from among transmission operations described in relation to FIG. 3 will be more specifically described. The authentication process to be described follows a Challenge-Response (C-R) method.

First, a server transmits a random number (RN) X to software of a device (operation 610). The RN X is generated in the server, and is not reproducible.

The software encrypts the received RN X by using a private key K_priv_d of the device and a private key K_priv_s of the software (operation 620). At this time, the software, that is the subject of communication, does not directly access the private key K_priv_d of the device, but receives a return value Yd from the device by using a system call function. That is, when the software inputs the RN X received by using the system call function, the device returns the return value Yd to the software, wherein the RN X is encrypted with the private key K_priv_d of the device thereby being the return value Yd.

Next, the RN Yd encrypted with the private key K_priv_d of the device, and the RN Ys encrypted with the private key K_priv_s of the software are transmitted to the server (operation 630).

The server decrypts the received encrypted RN Yd and Ys by respectively using a public key K_pub_d included in the certificate of the device, and a public key K_pub_s included in the certificate of the software. Then, the server respectively authenticates the device and the software by comparing the decrypted values with the RN X, and then checking accordance between the decrypted values and the RN X (operations 640 and 650).

Figure 7:
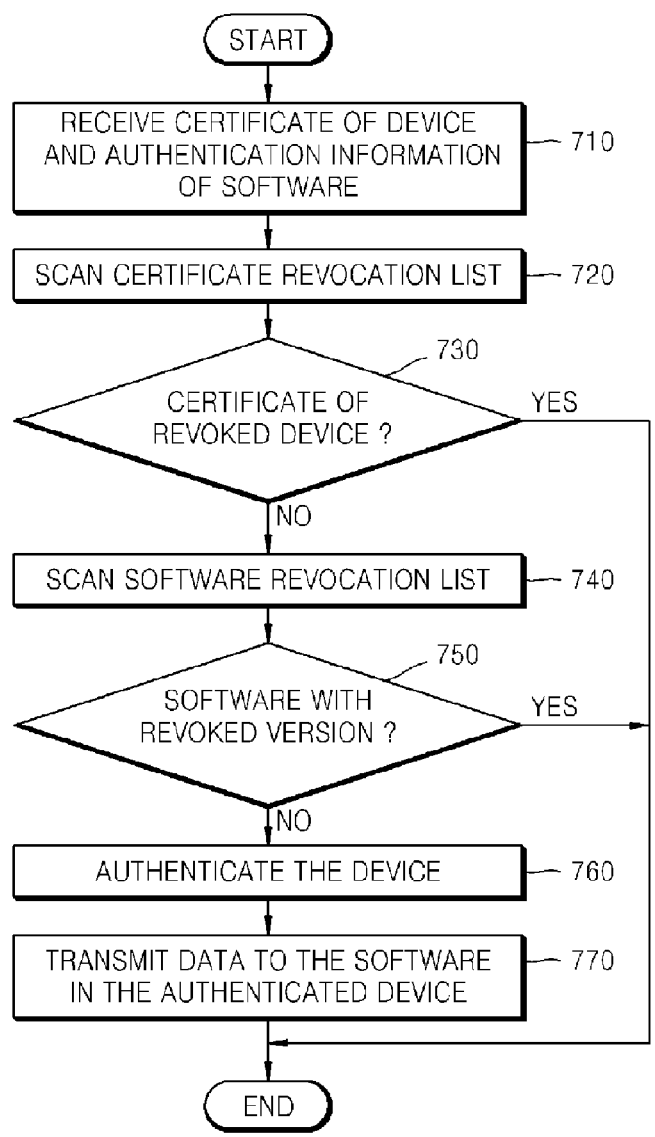
FIG. 7 is a flowchart illustrating a method of checking revocation of a device and software and transmitting data, according to another exemplary embodiment of the present invention.

FIG. 7 is a flowchart illustrating a method of checking revocation of a device and software and transmitting data, according to another exemplary embodiment of the present invention.

The method is similar to that described in relation to FIG. 3. However, authentication information of software described in the method related to FIG. 7 includes an ID, version information, and a digital signature of the software, while authentication information of software described in a method related to FIG. 3 includes a certificate including a public key. Each of the operations will now be described.

A server providing data receives authentication information of software and a certificate of a device of a user requesting data (operation 710). The certificate of the device includes IDs respectively identifying the device and the software, a public key, and a digital signature of a CA related to the public key. As described above, the authentication information of the software includes the ID, the version information, and the digital signature.

In order to verify security of the device and the software of the user, the server checks revocation of the device and the software. For this purpose, the server refers to a CRL received from the CA or retained in the server (operation 720), and first checks whether the certificate of the device is included in the CRL (operation 730). When the ID of the device is included in the CRL, the server refuses transmission of the data.

When the device is not included in the CRL, it is assumed that the security of the device is verified. After that, the security of the software version is verified. That is, since the authentication information of the software does not include a public key of the software itself, the security of the software version is verified. Thus, the server scans a separate software revocation list including information on software versions (operation 740), and checks whether the corresponding software version is a hacked version (operation 750). When the corresponding software version is determined as the hacked version, that is, when the corresponding software is included in the software revocation list, the server refuses the transmission of the requested data.

When the software of the corresponding version is not included in the software revocation list, it is assumed that the security of the software is verified. Thus, next operations of authenticating the device and transmitting the data are performed (operations 760 and 770).

In addition, the software selectively undergoes an authentication process via a digital signature capable of proving the security of the software when the software is installed or executed in the device. That is, through the digital signature it could be guaranteed to check forgery/alteration of execution codes of the software.

Figure 8A:
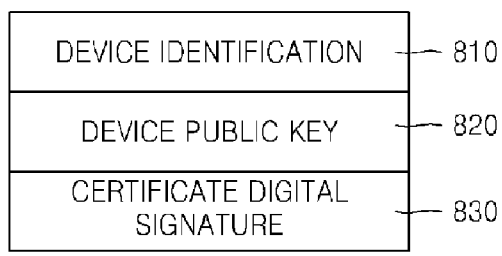
FIG. 8A is a block diagram illustrating a structure of a certificate of a device.
Figure 8B:
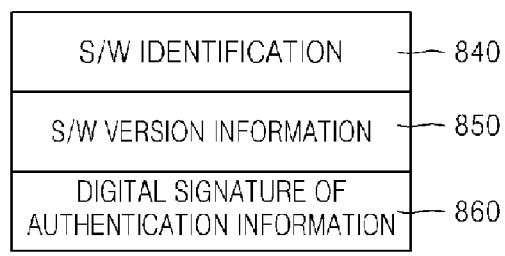
FIG. 8B is a block diagram illustrating a structure of authentication information of software, according to another exemplary embodiment of the present invention.

FIG. 8A is a diagram illustrating a structure of a certificate of a device, and FIG. 8B is a diagram illustrating a structure of authentication information of software, according to another exemplary embodiment of the present invention.

FIG. 8A illustrates a data structure of the certificate of the device, and FIG. 8B illustrates a data structure of the authentication information of the software. Referring to FIG. 8A, the certificate of the device includes an ID 810 of the device, a public key 820, and a digital signature 830 of a certificate related to a CA. Meanwhile, FIG. 8B includes an ID 840 of the software, version information 850, and a digital signature 860 related to authentication information of the CA, wherein the digital signature 860 is for checking forgery/alteration of the authentication information of the software.

When a CRL is checked as described in the previous exemplary embodiment in relation to FIG. 7, IDs of devices included in the CRL, and the ID 810 included in FIG. 8A are compared with each other, and authentication of a device is performed by using the public key 820.

Meanwhile, the authentication information FIG. 8B of the software includes the version information 850 for checking whether the version of the software has been hacked, thereby causing it to be revoked.

Thus, by using the certificate FIG. 8A and the authentication information FIG. 8B, the server may pre-verify the security of the device and software.

Figure 9:
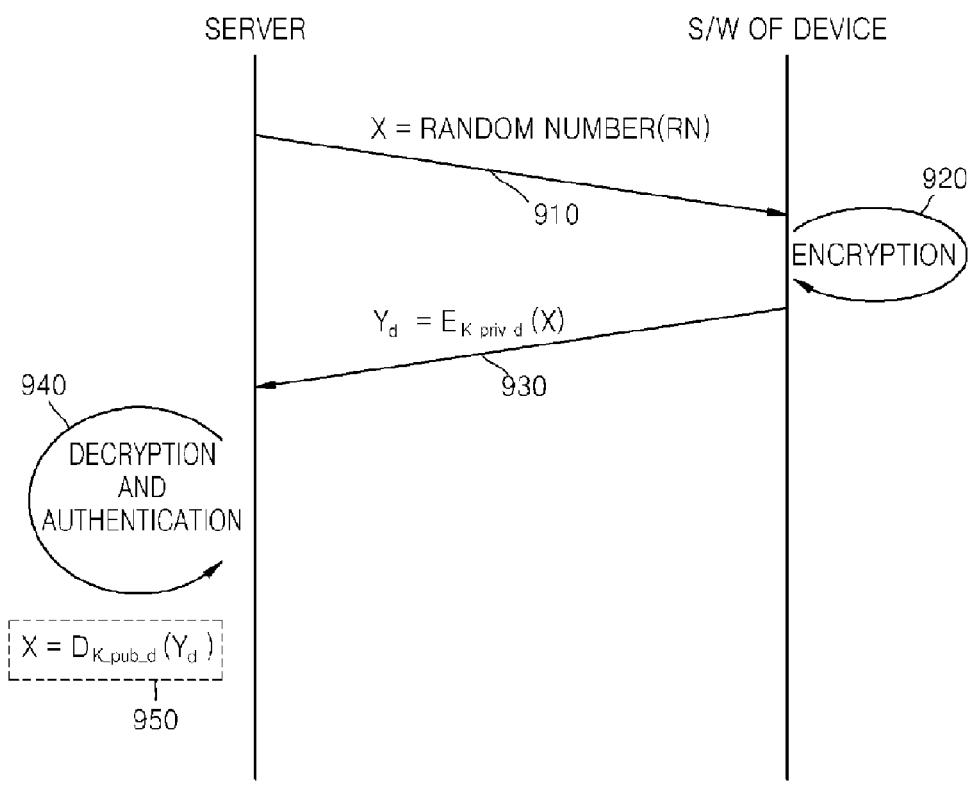
FIG. 9 is a diagram illustrating a process of authenticating a device, according to another exemplary embodiment of the present invention.

FIG. 9 is a diagram illustrating a process of authenticating a device, according to another exemplary embodiment of the present invention.

Referring to FIG. 9, an authentication process corresponding to operation 760 from among transmission operations described in relation to FIG. 7 will be more specifically described. The authentication process follows a Challenge-Response (C-R) method.

First, a server generates a RN X, and transmits the RN X to software of the device (operation 910).

The software encrypts the received RN X by using a private key K_priv_d of the device (operation 920). At this time, the software, that is the subject of communication, receives a return value Yd from the device by using a system call function.

Next, the RN Yd encrypted with the private key K_priv_d of the device is transmitted to the server (operation 930).

The server decrypts the received encrypted RN Yd by using a public key K_pub_d included in the certificate of the device, and authenticates the device by comparing the decrypted value with the RN X, and the checking accordance between the decrypted value and the RN X (operations 940 and 950).

Figure 10:
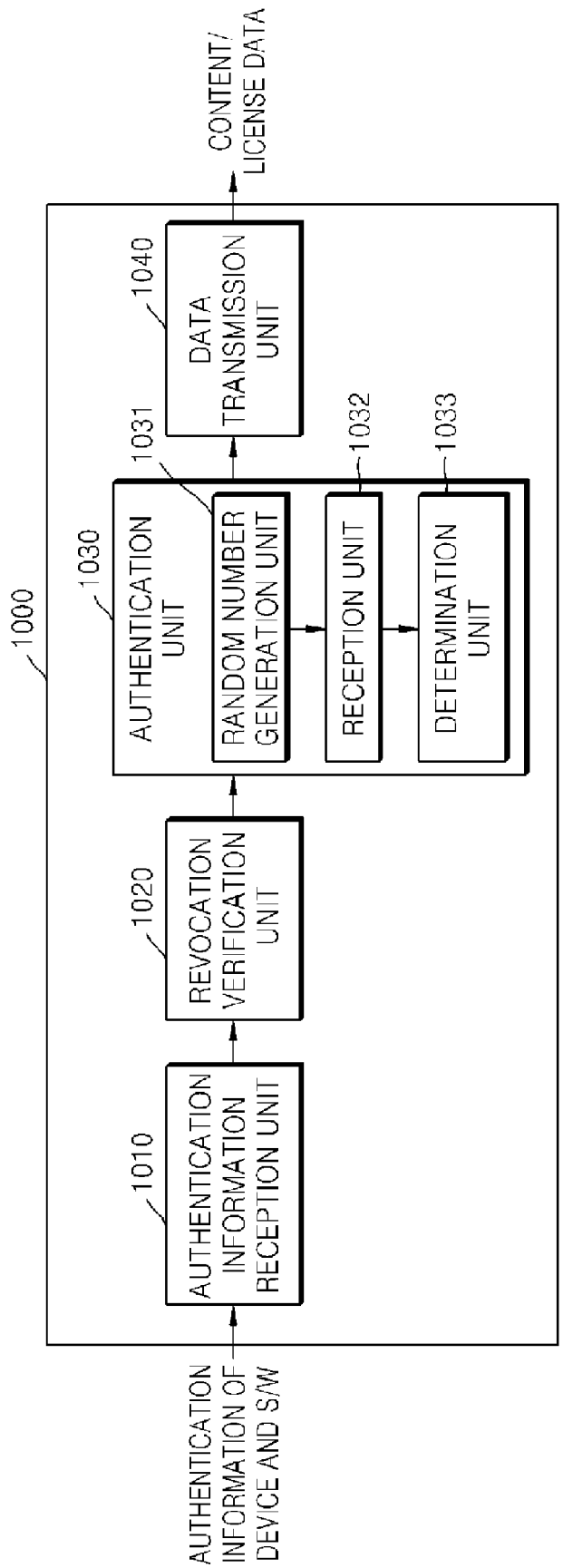
FIG. 10 is a block diagram illustrating a data server checking revocation of a device and software and transmitting data, according to another exemplary embodiment of the present invention.

FIG. 10 is a block diagram illustrating a data server 1000 checking revocation of a device and software and transmitting data, according to another exemplary embodiment of the present invention.

The data server 1000 generally includes an authentication information reception unit 1010 receiving authentication information of a device, and authentication information of software accessing data in the device, a revocation verification unit 1020 checking revocation of the device and the software based on the received authentication information, a data transmission unit 1040 transmitting requested data to the software of the device in the case where the device and the software are not revoked, and an authentication unit 1030 selectively performing authentication of the device and the software.

In addition, the authentication unit 1030 may further include a random number generation unit 1031 generating a random number value and transmitting the random number value, a reception unit 1032 receiving return values, wherein the random number value is respectively encrypted with private keys of the device and software, thereby being the return values, and a determination unit 1033 decrypting the received return values with public keys of the device and the software included in certificates, and comparing the return values with the random number value.

As described above, according to the transmission method and the transmission system of the present invention, during transmission of data such as content or a license, security of not only the device but also the software executed in the device is checked and transmitted. Accordingly, the data can be more safely transmitted.

The exemplary embodiments of the method of checking revocation of a content device and transmitting data according to the present invention described above can be written as computer programs and can be implemented in general-use digital computers that execute the programs using a computer readable recording medium.

Also, the data structure used in the exemplary embodiments of the present invention described above can be recorded on a computer readable recording medium in a variety of ways.

Examples of the computer readable recording medium include magnetic storage media (e.g., ROM, floppy disks, hard disks, etc.), and optical recording media (e.g., CD-ROMs, or DVDs).

While the present invention has been particularly shown and described with reference to exemplary embodiments thereof, it will be understood by those of ordinary skill in the art that various changes in form and details may be made therein without departing from the spirit and scope of the present invention as defined by the following claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of checking revocation of a content device and transmitting data, the method comprising:
    receiving authentication information of a device requesting transmission of data, and authentication information of digital rights management (DRM) software that authorizes access of the data in the device;
    checking revocation of the device and the DRM software, based on the received authentication information,
    wherein the checking of the revocation further comprises:
    checking a device Certification Revocation List (CRL) related to a certificate of the device, where the CRL comprises a device identifier, a device public key, and a digital signature for the device and wherein the received authentication information of the device is compared with at least one of the device identifier, the device public key, and the digital signature for each of devices identified in the CRL; and
    checking a software revocation list (SRL) separate from the CRL and related to a certificate of the DRM software, where the SRL comprises a software identifier, a software public key, and a digital signature for the DRM software and wherein the received authentication information of the DRM software is compared with at least one of the software identifier, the software public key, and the digital signature for each of the DRM software identified in the SRL;
    authenticating the device based on the checking of the CRL;
    authenticating the DRM software based on the separate checking of the SRL; and
    transmitting the data to the device, when the device and the DRM software are not revoked and the authentication of the device and the DRM software succeeds.

2. The method of claim 1, wherein the received authentication information of the device is provided in a certificate,
    wherein the certificate of the device comprises the device identifier, the device public key, and the digital signature which is a digital signature of a Certification Authority (CA), and
    wherein the received authentication information of the DRM software comprises the software identifier, version information of the DRM software, and the digital signature for the DRM software which is a digital signature of the CA.

3. The method of claim 2, wherein the checking the SRL further comprises checking version information of the DRM software against version information for each of said certificate stored in the SRL.

4. The method of claim 3, wherein the authenticating of at least one of the device and the DRM software is performed by a Challenge-Response (C-R) method, and comprises:
generating a random number value and transmitting the random number value;
receiving a return value, wherein the return value is the random number value encrypted with a private key of the device;
decrypting the received return value with a public key of the device comprised in the certificate; and
comparing the decrypted return value with the random number value, and authenticating the device.

5. The method of claim 4, wherein when the DRM software is installed or executed in the device, the method further comprises authenticating the DRM software by using a digital signature of a CA related to execution codes of the DRM software.

6. The method of claim 1, wherein the certificate of the DRM software further comprises version information of the DRM software, and
wherein the checking the SRL further comprises checking the version information of the DRM software, and checking the revocation of the DRM software having the version indicated by the version information in the SRL.

7. The method of claim 6, wherein the authenticating of at least one of the device and the DRM software is performed by a Challenge-Response (C-R) method, and comprises:
generating a random number value and transmitting the random number value;
receiving return values, wherein the return values are the random number value respectively encrypted with private keys of the device and the DRM software;
decrypting the received return values with the device public key and the certificate of the DRM software; and
comparing the decrypted return values with the random number value, and
authenticating the device and the DRM software based on the comparing.

8. The method of claim 7, wherein the authenticating of at least one of the device and the DRM software further comprises exchanging a session key for using a secure session for transmitting the data.

9. The method of claim 6, wherein the device provides a system call function encrypting the random number value with the private key of the device, according to a request of the DRM software.

10. A transmission system, having a first device and a second device, which checks revocation of the first device and which transmits data to the first device, the transmission system comprising:
the first device which transmits a request signal of data transmission, authentication information of the first device, and authentication information of a digital rights management (DRM) software which authorizes access to the data in the first device; and
the second device which receives the transmitted authentication information, authenticating the device and the DRM software, and as a result of checking the revocation of the first device and the DRM software and the authentication of the device and the DRM software, when the first device and the DRM software are not revoked and when the authentication of the device and the DRM software succeeds, transmits the data to the first device,
wherein the checking of the revocation further comprises:
checking a device Certification Revocation List (CRL) related to a the certificate of the first device, where the CRL comprises a device identifier, a device public key, and a digital signature for the device and wherein the received authentication information of the first device is compared with at least one of the device identifier, the device public key, and the digital signature for each of devices identified in the CRL; and
checking a software revocation list (SRL) separate from the CRL and related to a certificate of the DRM software, where the SRL comprises a software identifier, a software public key, and a digital signature for the DRM software and wherein the received authentication information of the DRM software is compared with at least one of the software identifier, the software public key, and the digital signature for each of the DRM software identified in the SRL;
wherein the authentication further comprises the second device authenticating the first device based on the checking the CRL, and wherein the second device authenticates the DRM software based on the separate checking of the SRL.

11. The transmission system of claim 10, wherein:
the second device generates a random number value by a Challenge-Response (C-R) method and transmits the random number value,
the first device receives the random number value, respectively encrypts the random number value with private keys of the first device and the DRM software, thereby generating return values, and transmits return values, and
the second device receives the return values, decrypts the return values with the device public key of the first device and the certificate of the DRM software, compares the decrypted return values with the random number value, and authenticates the first device and the DRM software based on the comparison.

12. The transmission system of claim 10, wherein the received authentication information of the first device is provided in a certificate,
wherein the certificate of the first device comprises the device identifier, the device public key, and the digital signature which is a digital signature of a Certification Authority (CA); and
wherein the received authentication information of the DRM software comprises the software identifier and version information of the DRM software, and the digital signature for the DRM software which is a digital signature of the CA.

13. The transmission system of claim 12, wherein the checking the SRL further comprises checking version information of the DRM software against version information for each of said certificate stored in the SRL.

14. A data server for checking revocation of a content device and transmitting data, the data server comprising:
an authentication information reception unit configured to receive authentication information of a device requesting transmission of data, and authentication information of a digital rights management (DRM) software which authorizes access to the data in the device;

a revocation verification unit configured to check revocation of the device and the DRM software, based on the received authentication information; and a data transmission unit configured to transmit the data to the device, when the device and the DRM software are not revoked as a result of the check, wherein the checking of the revocation further comprises:

checking a device Certification Revocation List (CRL) related to a certificate of a device, where the CRL comprises a device identifier, a device public key, and a digital signature for the device and wherein the received authentication information of the device is compared with at least one of the device identifier, the device public key, and the digital signature for each of devices identified in the CRL; and checking a software revocation list (SRL) separate from the CRL and related to a certificate of the DRM software, where the SRL comprises a software identifier, a software public key, and a digital signature for the DRM software and wherein the received authentication information of the DRM software is compared with at least one of the software identifier, the software public key, and the digital signature for each of the DRM software identified in the SRL;

wherein an authentication unit is configured to authenticate the device based on the checking the CRL and configured to authenticate the DRM software based on the separate checking of the SRL, and when the authentication of the device and the authentication of the DRM software succeeds, the data transmission unit transmits the data to the DRM software of the device for the authentication of the data by the DRM software, wherein the data server is configured to implement the authentication information reception unit, the revocation verification unit, the data transmission unit and the authentication unit.

15. The data server of claim 14, wherein the received authentication information of the device is provided in a certificate, wherein the certificate of the device comprises the device identifier, and the device public key, and the digital signature which is a digital signature of a Certification Authority (CA); and wherein the received authentication information of the DRM software comprises the software identifier and version information of the DRM software, and the digital signature for the DRM software which is a digital signature of the CA.

16. The data server of claim 15, wherein the revocation verification unit checks the SRL comprising version information of the DRM software and the CRL comprising version information of the device, and determines the revocation of the device and determines the revocation of the DRM software separately based on the version information indicated in the respective SRL and CRL.

17. The data server of claim 14, wherein the authentication unit is performed by a Challenge-Response (C-R) method, and comprises:

a random number generation unit which generates a random number value and transmitting the random number value;

a reception unit which receives return values, wherein the return values are the random number value respectively encrypted with private keys of the device and the DRM software; and a determination unit which decrypts the received return values with the device public and a certificate of the DRM software, and which compares the return values with the random number value, wherein the data server is configured to implement the random number generation unit, the reception unit, and the determination unit.

18. A non-transitory computer readable recording medium having recorded thereon a program for executing a method of checking revocation of a content device and transmitting data, the method comprising:

receiving authentication information of a device requesting transmission of data, and authentication information of a digital right management (DRM) software accessing the data in the device;

checking revocation of the device and the DRM software, based on the received authentication information, wherein the checking of the revocation further comprises:

checking a device Certification Revocation List (CRL) related to at-he certificate of the device, where the CRL comprises a device identifier, a device public key, and a digital signature for the device and wherein the received authentication information of the device is compared with at least one of the device identifier, the device public key, and the digital signature for each of devices identified in the CRL; and checking a software revocation list (SRL) separate from the CRL and related to a certificate of the DRM software, where the SRL comprises a software identifier, a software public key, and a digital signature for the DRM software and wherein the received authentication information of the DRM software is compared with at least one of the software identifier, the software public key, and the digital signature for each of the DRM software identified in the SRL;

authenticating the device based on the checking the CRL;

authenticating the DRM software based on the separate checking of the SRL; and transmitting the data to the device, when the device and the DRM software are not revoked and the authentication of the device and the DRM software succeeds.

* * * * *